(12) United States Patent
Trend

(10) Patent No.: US 9,317,161 B2
(45) Date of Patent: Apr. 19, 2016

(54) TOUCH SENSOR WITH SPACERS SUPPORTING A COVER PANEL

(75) Inventor: Matthew Trend, Fareham (GB)

(73) Assignee: Atmel Corporation, San Jose, CA (US)

( * ) Notice: Subject to any disclaimer, the term of this patent is extended or adjusted under 35 U.S.C. 154(b) by 806 days.

(21) Appl. No.: 13/302,527

(22) Filed: Nov. 22, 2011

(65) Prior Publication Data

US 2013/0127770 A1 May 23, 2013

(51) Int. Cl.
*G06F 3/044* (2006.01)

(52) U.S. Cl.
CPC ............ *G06F 3/044* (2013.01); *Y10T 29/49105* (2015.01)

(58) Field of Classification Search
CPC ........................................ G06F 3/044
USPC ........................................... 345/173
See application file for complete search history.

(56) References Cited

U.S. PATENT DOCUMENTS

| | | | |
|---|---|---|---|
| 7,196,281 B2 | 3/2007 | Cok et al. | |
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 2001/0026330 A1* | 10/2001 | Oh ...................... | G02F 1/13338 349/12 |
| 2003/0122801 A1* | 7/2003 | Yu ....................... | G02F 1/13338 345/173 |
| 2003/0234769 A1* | 12/2003 | Cross et al. ................. | 345/173 |
| 2006/0017710 A1* | 1/2006 | Lee et al. ..................... | 345/173 |
| 2009/0135161 A1* | 5/2009 | Endo ........................... | 345/174 |
| 2009/0167721 A1* | 7/2009 | Hamm et al. ............... | 345/174 |
| 2009/0315854 A1 | 12/2009 | Matsuo | |
| 2010/0271328 A1* | 10/2010 | Sekiguchi et al. .......... | 345/174 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |

FOREIGN PATENT DOCUMENTS

WO WO 2012/129247 9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Quan-Zhen Wang
*Assistant Examiner* — David Lee
(74) *Attorney, Agent, or Firm* — Baker Botts L.L.P.

(57) ABSTRACT

In one embodiment, a touch sensor includes an insulating substrate comprising a first face. The touch sensor further includes a plurality of electrodes comprising one or more conductive materials formed on the insulating substrate. The touch sensor may also include a plurality of spacers extending outwardly from the first face of the first insulating substrate. Each spacer of the plurality of spacers may extend substantially the same distance from the first face of the insulating substrate. The plurality of spacers are operable to maintain a substantially consistent air gap between the plurality of electrodes and a cover panel when the cover panel is attached to the insulating substrate.

21 Claims, 3 Drawing Sheets

TOUCH SENSOR WITH SPACERS SUPPORTING A COVER PANEL

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display panel, for example. In a touch sensitive display application, the touch sensor may enable a user to interact directly with what is displayed on the panel, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. A capacitive touch screen may include an insulator coated with a substantially transparent conductor in a particular pattern. When an object touches or comes within proximity of the surface of the capacitive touch screen, a change in capacitance may occur within the touch screen at the location of the touch or proximity. A controller may process the change in capacitance to determine its position on the touch screen.

DESCRIPTION OF EXAMPLE EMBODIMENTS

Figure 1:
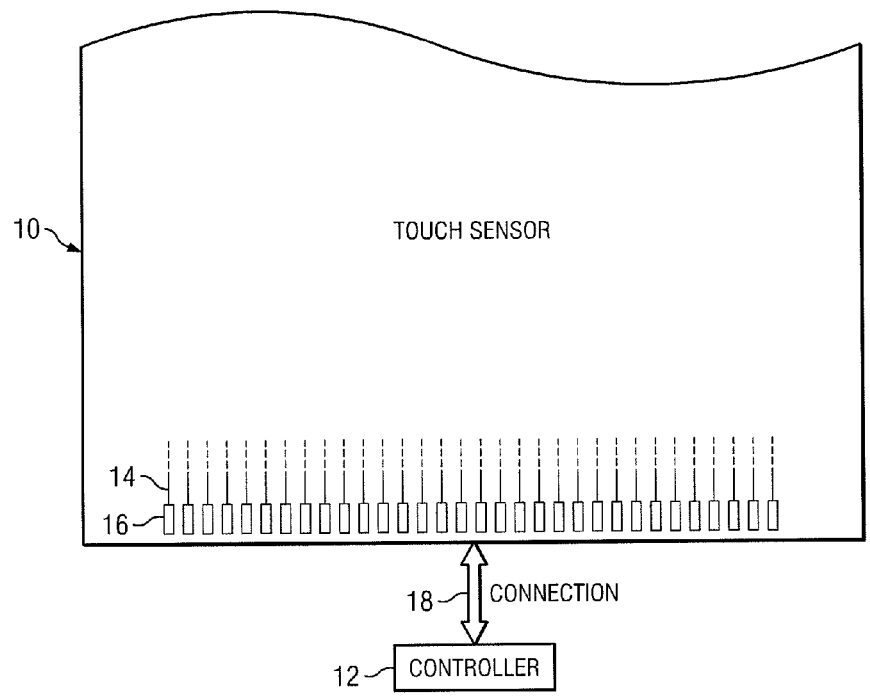
FIG. 1 illustrates an example touch sensor with an example controller.

FIG. 1 illustrates an example touch sensor 10 with an example controller 12. Touch sensor 10 and controller 12 may be part of a device, such as a smartphone, a PDA, a tablet computer; a laptop computer, a desktop computer, a kiosk computer, a satellite navigation device, a portable media player, a portable game console, a point-of-sale device, another suitable device, a suitable combination of two or more of these, or a suitable portion of one or more of these. Herein, reference to a touch sensor may encompass a touch screen, and vice versa, where appropriate. Touch sensor 10 and controller 12 may detect the presence and location of a touch or the proximity of an object within a touch-sensitive area of touch sensor 10. Herein, reference to a touch sensor may encompass both the touch sensor and its controller, where appropriate. Similarly, reference to a controller may encompass both the controller and its touch sensor, where appropriate. Touch sensor 10 may include one or more touch-sensitive areas, where appropriate. Touch sensor 10 may include an array of drive and sense electrodes (or an array of electrodes of a single type (e.g. drive)) disposed on a substrate, which may be a dielectric material.

An electrode (whether a drive electrode or a sense electrode) may be an area of conductive material forming a shape, such as for example a disc, square, rectangle, other suitable shape, or suitable combination of these. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape, where appropriate. In particular embodiments, the conductive material of an electrode may occupy approximately 50% of the area of its shape. As an example and not by way of limitation, an electrode may be made of ITO and the ITO of the electrode may occupy approximately 50% of the area of its shape in a hatched, mesh, or other suitable pattern. In particular embodiments, the conductive material of an electrode may occupy approximately 5% of the area of its shape. As an example and not by way of limitation, an electrode may be made of fine lines of metal or other conductive material (such as for example copper, silver, or a copper- or silver-based material) and the fine lines of conductive material may occupy approximately 5% of the area of its shape in a hatched, mesh, or other suitable pattern. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fills having any suitable patterns. Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes or the means of electrically isolating or physically separating the shapes from each other) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

One or more portions of the substrate of touch sensor 10 may be made of polyethylene terephthalate (PET), glass, or other suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

A mechanical stack may contain the substrate (or multiple substrates) and the conductive material forming the drive or sense electrodes of touch sensor 10. In typical configurations, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. In typical configurations, the first layer of OCA may be disposed between the cover panel and the substrate with the conductive material forming the drive or sense electrodes. As described below in connection with FIG. 2A, in particular embodiments of the present disclosure, spacers such as microdots (rather than adhesive material) are placed between the cover panel and the substrate with the conductive material forming the drive or sense electrodes in order to maintain a generally consistent air gap between the cover panel and the substrate with the conductive material.

The mechanical stack may also include a second layer of OCA and a dielectric layer (which may be made of PET, glass, or other suitable material, similar to the substrate with the conductive material forming the drive or sense electrodes). The second layer of OCA may be disposed between the substrate with the conductive material making up the drive or sense electrodes and the dielectric layer, and the dielectric layer may be disposed between the second layer of OCA and an air gap to a display panel of a device including touch sensor 10 and controller 12. The display panel may be any suitable means for displaying an image. For example, the display panel may include a liquid crystal display (LCD), light emitting diode (LED) display, or other suitable display. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm (including the conductive material forming the drive or sense electrodes); the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses.

Touch sensor 10 may implement a capacitive foam of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and controller 12 may measure the change in capacitance. By measuring changes in capacitance throughout the array, controller 12 may determine the position of the touch or proximity within the touch-sensitive area(s) of touch sensor 10.

In a self-capacitance implementation, touch sensor 10 may include an array of electrodes of a single type (e.g. drive) that may each form a capacitive node. When an object touches or comes within proximity of the capacitive node, a change in self-capacitance may occur at the capacitive node and controller 12 may measure the change in capacitance, for example, as a change in the amount of charge needed to raise the voltage at the capacitive node by a pre-determined amount. As with a mutual-capacitance implementation, by measuring changes in capacitance throughout the array, controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have a single-layer configuration, with drive and sense electrodes disposed in a pattern on one side of a substrate. In such a configuration, a pair of drive and sense electrodes capacitively coupled to each other across a space between them may form a capacitive node. In a single-layer configuration for a self-capacitance implementation, electrodes of only a single type (e.g. drive) may be disposed in a pattern on one side of the substrate. As an alternative to a single-layer configuration, touch sensor 10 may have a two-layer configuration, with drive electrodes disposed in a pattern on one side of a substrate and sense electrodes disposed in a pattern on another side of the substrate. In such a configuration, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across the substrate at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Controller 12 may detect and process the change in capacitance to determine the presence and location of the touch or proximity input. Controller 12 may then communicate information about the touch or proximity input to one or more other components (such one or more central processing units (CPUs) or digital signal processors (DSPs)) of a device that includes touch sensor 10 and controller 12, which may respond to the touch or proximity input by initiating a function of the device (or an application running on the device) associated with it. Although this disclosure describes a particular controller having particular functionality with respect to a particular device and a particular touch sensor, this disclosure contemplates any suitable controller having any suitable functionality with respect to any suitable device and any suitable touch sensor.

Controller 12 may be one or more integrated circuits (ICs)—such as for example general-purpose microprocessors, microcontrollers, programmable logic devices or arrays, application-specific ICs (ASICs)—on a flexible printed circuit (FPC) bonded to the substrate of touch sensor 10, as described below. Controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular controller having a particular implementation with particular components, this disclosure contemplates any suitable controller having any suitable implementation with any suitable components.

Tracks 14 of conductive material disposed on the substrate of touch sensor 10 may couple the drive or sense electrodes of touch sensor 10 to bond pads 16, also disposed on the substrate of touch sensor 10. As described below, bond pads 16 facilitate coupling of tracks 14 to controller 12. Tracks 14 may extend into or around (e.g. at the edges of) the touch-sensitive area(s) of touch sensor 10. Particular tracks 14 may provide drive connections for coupling controller 12 to drive electrodes of touch sensor 10, through which the drive unit of controller 12 may supply drive signals to the drive electrodes. Other tracks 14 may provide sense connections for coupling controller 12 to sense electrodes of touch sensor 10, through which the sense unit of controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector at an edge of the substrate of touch sensor 10 (similar to tracks 14).

Bond pads 16 may be located along one or more edges of the substrate, outside the touch-sensitive area(s) of touch sensor 10. As described above, controller 12 may be on an FPC. Bond pads 16 may be made of the same material as tracks 14 and may be bonded to the FPC using an anisotropic conductive film (ACF). Connection 18 may include conductive lines on the FPC coupling controller 12 to bond pads 16, in turn coupling controller 12 to tracks 14 and to the drive or sense electrodes of touch sensor 10. This disclosure contemplates any suitable connection 18 between controller 12 and touch sensor 10.

Figure 2A:
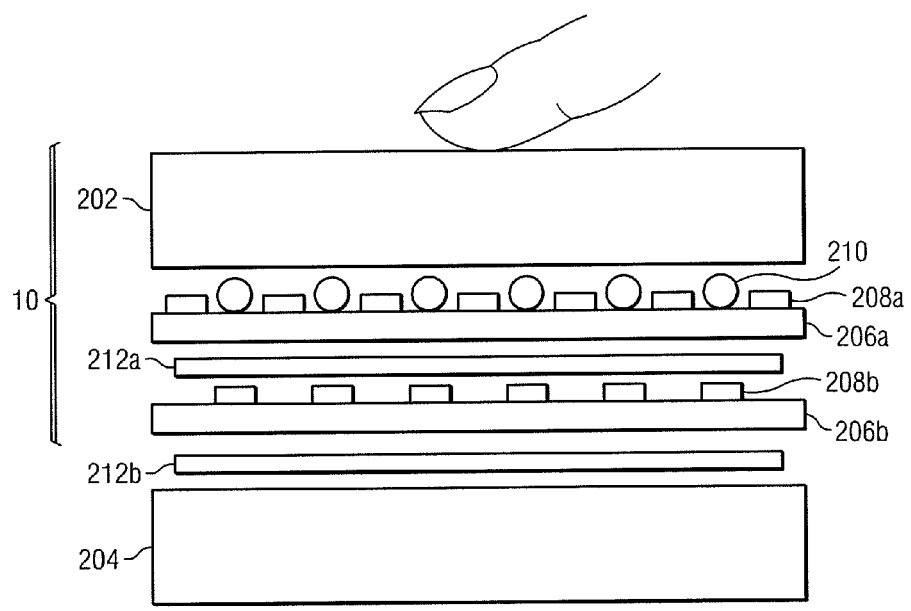
FIGS. 2A-2C illustrate an example touch sensor with spacers supporting a cover panel.
Figure 2B:
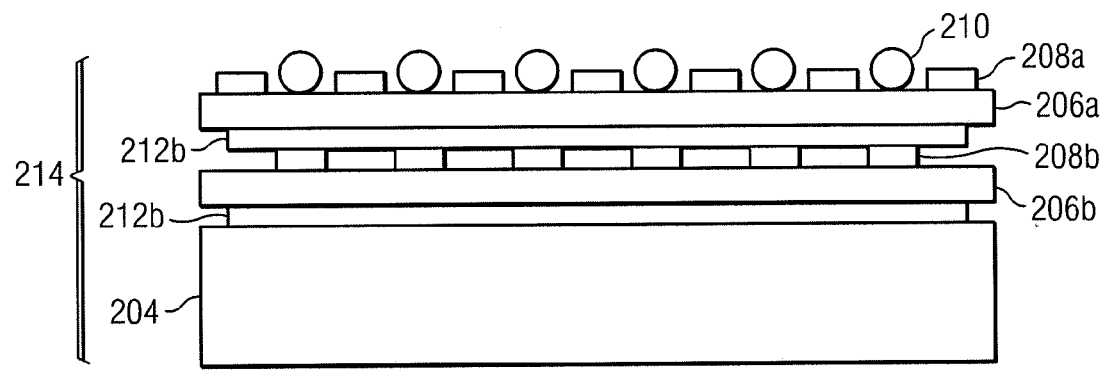

FIG. 2A illustrate an example embodiment of touch sensor 10 with spacers 210 supporting a cover panel 202. In the embodiment depicted, spacers 210 are disposed between cover panel 202 and substrate 206*a* with electrodes 208*a*. As described above, in typical configurations, a layer of adhesive may be used to attach cover panel 202 to substrate 206*a* with electrodes 208*a* of touch sensor 10. Once an adhesive layer has been applied to cover panel 202 and substrate 206*a* with electrodes 208, it may be difficult to separate cover panel 202 and substrate 206*a* for rework, troubleshooting, or other purposes. Furthermore, in some situations, it may be relatively difficult or expensive to attach a rigid cover panel 202 to a rigid substrate 206*a* using a layer of adhesive. In some configurations, even if substrate 206*a* is made out of flexible material (such as FPC), it may be attached to a rigid object (such as display panel 204) before it is coupled to cover panel 202. For example, as shown in FIG. 2B, during manufacturing, substrate 206*a* with electrodes 208*a* may be attached to a rigid object such as display panel 204 to form an integrated sensor-display module 214. In some situations, it may be more difficult to attach cover panel 202 to integrated sensor-display module 214 using a layer of adhesive than it would be to attach cover panel 202 directly to substrate 206*a* due to the rigidity of integrated sensor-display module 214.

In other situations, cover panel 202 may be secured to substrate 206*a* with electrodes 208*a* of touch sensor 10 (e.g., at one or more points of the edges of cover panel 202) with an air gap in between cover panel 202 and substrate 206*a*. However, in such configurations, if cover panel 202 does not have sufficient support at various points, the thickness of the air gap between cover panel 202 and substrate 206*a* may vary at different points of touch sensor 10. Moreover, cover panel 202 may be subject to warping and/or bending, further increasing the chance of air gaps with varying thicknesses. A non-uniform air gap is problematic because the measurement sensitivity of each node (e.g., capacitive node) of touch sensor 10 may be dependent on the thickness of the air gap between cover panel 202 and the one or more electrodes 208 that form the node. Moreover, a cover panel 202 that is attached to substrate 206*a* with support only along the edges of cover panel 202 may be susceptible to visual interference (e.g., Newton's rings) or moisture ingress.

Particular embodiments may provide a touch sensor 10 with spacers 210 placed between substrate 208*a* and cover panel 202 and operable to support cover panel 202 at various points, including a central portion of cover panel 202 that is located inside of the edges of cover panel 202. In particular embodiments, a substantially uniform air gap between cover panel 202 and substrate 208*a* is maintained by spacers 210 when cover panel 202 and substrate 208*a* are coupled together. Particular embodiments may enable relatively easy separation of cover panel 202 from substrate 208*a* for troubleshooting or other purposes. Particular embodiments may also simplify the process of attaching cover panel 202 to an integrated sensor-display module 214 and thus enable certain touch sensor components to be manufactured separately from cover panels 202.

Spacers 210 may include any suitable material. In some embodiments, spacers 210 include an insulating material. For example, spacers 210 may be formed of glass or ink. As another example, spacers 210 may be formed of one or more polymers, such as polyester, polycarbonate, polystyrene, polyurethane, or other suitable polymer. Spacers 210 may have any suitable shape. For example, spacers may be spheres, hemispheres, beads, cylinders, polyhedrons (such as cubes, tetrahedrons, hexahedrons), or other suitable shape. In the embodiments depicted in FIG. 2A-2C, spacers 210 are generally spherical. In the embodiments depicted in FIGS. 3A-3C, spacers 210 are generally hexahedron shaped and thus may have a rectangular or square cross-section. Spacers 210 may have any suitable dimensions. As an example and not by way of limitation, spacers 210 may have a width or height of 10-100 micrometers.

Referring again to the embodiment depicted in FIG. 2A, spacers 210 are formed on substrate 206a. In other embodiments, spacers 210 are formed on electrodes 208a. In some embodiments, spacers 210 may be formed on substrate 206a or electrodes 208a during manufacturing of substrate 206a with electrodes 208a. In other embodiments, spacers 210 may be formed on cover panel 202 during the manufacturing of cover panel 202. Spacers 210 may be formed on substrate 206a, electrodes 208a, or cover panel 202 in any suitable manner. For example, spacers 210 may be formed on substrate 206a, electrodes 208a, or cover panel 202 by injection molding, screen printing, spraying (e.g., through a mask), sputtering, photolithography, embossing, machining, bead blasting, etching, or other suitable method. In some embodiments, spacers 210 may be formed independently of substrate 206a, electrodes 208a, or cover panel 202 and then attached to substrate 206a, electrodes 208a, or cover panel 202 using OCA or other suitable means.

In some embodiments, spacers 210 extend outwardly from a face of substrate 206a. For example, spacers 210 may be attached directly to the top face of substrate 206a or to electrodes 208a formed on the top face of substrate 206a and extend away from the top face of substrate 206a. In some embodiments, each spacer 210 of the plurality of spacers extends substantially the same distance from the top face of substrate 206a. The spacers 210 may be operable to maintain a substantially consistent air gap between each electrode 208a and cover panel 202 when cover panel 202 is attached to substrate 206a.

In addition to spacers 210 placed between substrate 206a and cover panel 202, touch sensor 10 of FIG. 2A includes substrate 206b, electrodes 208, and layers of adhesive 212. In some embodiments, touch sensor 10 may overlay display panel 204. In the embodiment depicted, touch sensor 10 includes two substrates 206 that each have a set of electrodes 208 formed on their respective upper sides. In particular embodiments, electrodes 208 may be formed on either side of substrates 206. In particular embodiments, a single substrate or more than two substrates 206 may be used. In particular embodiments, one or more substrates 206 may include one or more sets of electrodes 208. In the embodiment depicted, adhesive layer 212a is used to couple substrates 206 together. Similarly, adhesive layer 212b may be used to couple substrate 206b to display panel 204. In other embodiments utilizing a single substrate 206a, adhesive layer 212b may coupled substrate 206a to display panel 204. In other embodiments, substrate 212 may be coupled to display panel 204 using other suitable means. For example, substrate 212 may be laminated to a rigid material (e.g., glass or plastic) and then mounted onto display panel 204. In some embodiments, substrate 212 and display panel 204 may be mounted onto a frame that couples substrate 212 and display panel 204 together. As another example, substrate 212 may be coupled to cover panel 202 in any suitable manner to form touch sensor 10 and then touch sensor 10 may be coupled to the display 204 using any suitable means, such as a fastener or other part of a device that utilizes touch sensor 10 and display 204. In some embodiments, an air gap may be maintained between substrate 212 and display panel 204 after substrate 212 and display panel 204 are coupled together.

FIG. 2B depicts an example integrated sensor-display module 214. In the embodiment depicted, integrated sensor-display module 214 includes display panel 204, substrates 206, electrodes 208 and spacers 210 coupled together. The components of integrated sensor-display module 214 may be coupled together using any suitable method. In some embodiments, integrated sensor-display module 214 may be manufactured and/or sold independently of cover panel 202.

Figure 2C:
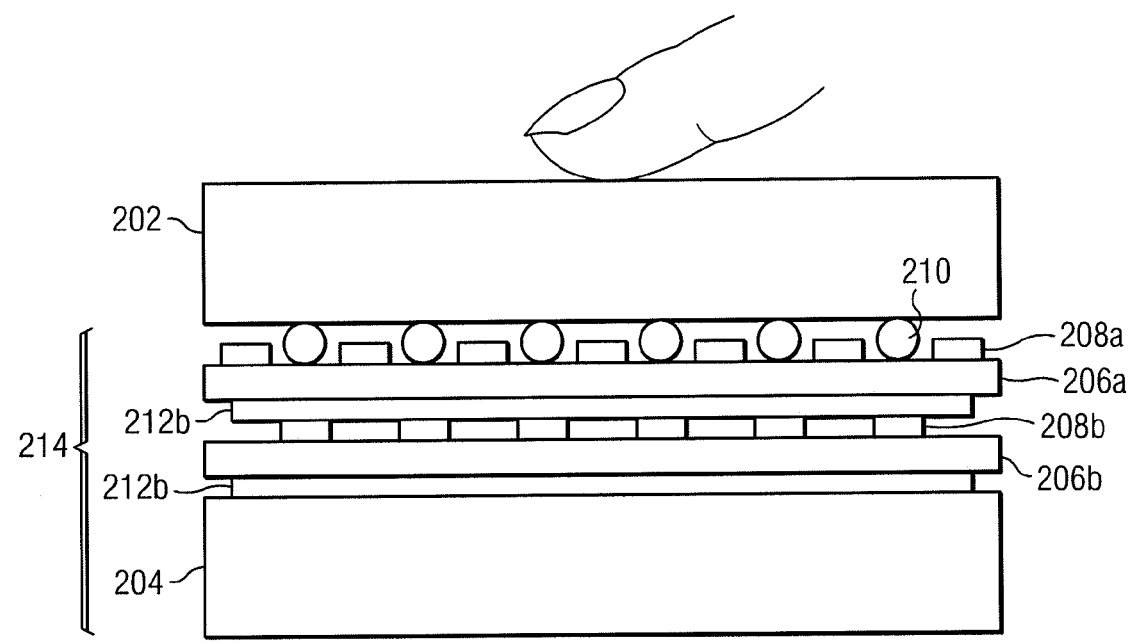

FIG. 2C depicts the integrated sensor-display module 214 of FIG. 2B coupled to cover panel 202. Cover panel 202 may be coupled to integrated sensor-display module 214 using any suitable method. In some embodiments, cover panel 202 is removably attached to integrated sensor-display module 214. For example, one or more fasteners may be used along the outer edges of cover panel 202 to attach cover panel 202 to integrated sensor-display module 214. After cover panel 202 is attached to integrated sensor-display module 214, spacers 210 may contact cover panel 202 and provide support at various points of cover panel 202. This support may mitigate or prevent bending or warping of cover panel 202, thus facilitating the maintenance of a consistent air gap between cover panel 202 and electrodes 208.

Figure 3A:
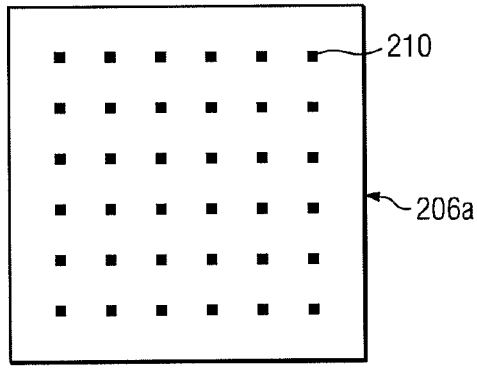
FIGS. 3A-3C are top-view drawings illustrating example patterns of spacers of a touch sensor.
Figure 3B:
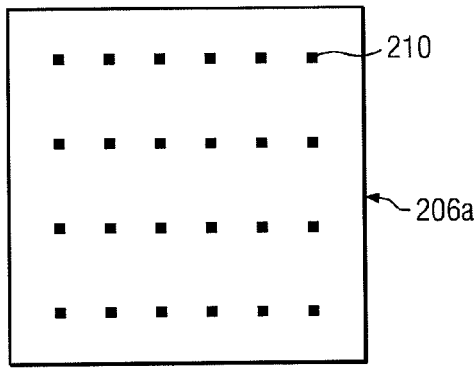
Figure 3C:
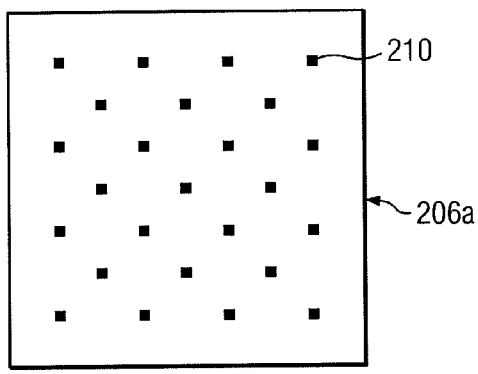

FIGS. 3A-3C are top-view drawings illustrating example patterns for spacers 210 of cover panel 202. In FIGS. 3A-3C, spacers 210 are depicted as being formed (e.g., by printing an insulating material) on a face of substrate 206a. In other embodiments, the patterns of FIGS. 3A-3C (or other suitable pattern) may be formed on electrodes 208 or cover panel 202.

In the embodiment depicted in FIG. 3A, spacers 210 are arranged in a square pattern. Spacers 210 are placed in rows and columns. Each row is spaced approximately a particular distance from its adjacent rows and each column is also spaced approximately the same particular distance from its adjacent columns. The particular distance may be any suitable distance, such as a distance between 0.5 millimeter (mm) and 10 mm.

In the embodiment depicted in FIG. 3B, spacers 210 are arranged in a rectangular pattern. Spacers 210 are placed in rows and columns. Each row is spaced approximately the same distance from its adjacent rows and each column is also spaced approximately the same distance from its neighboring columns. However, the distance between adjacent rows and the distance between adjacent columns is not equal. The distances may be any suitable distances, such as distances between 0.5 mm and 10 mm.

In the embodiment depicted in FIG. 3B, spacers 210 are arranged in a diamond pattern. In this pattern, each row is separated from its adjacent rows by approximately the same distance in a vertical direction, but spacers 210 of adjacent rows are displaced by a horizontal distance (e.g., half of the distance between adjacent spacers 210 in a common row). In other embodiments, any other suitable patterns of spacers 210 may be formed.

Figure 4:
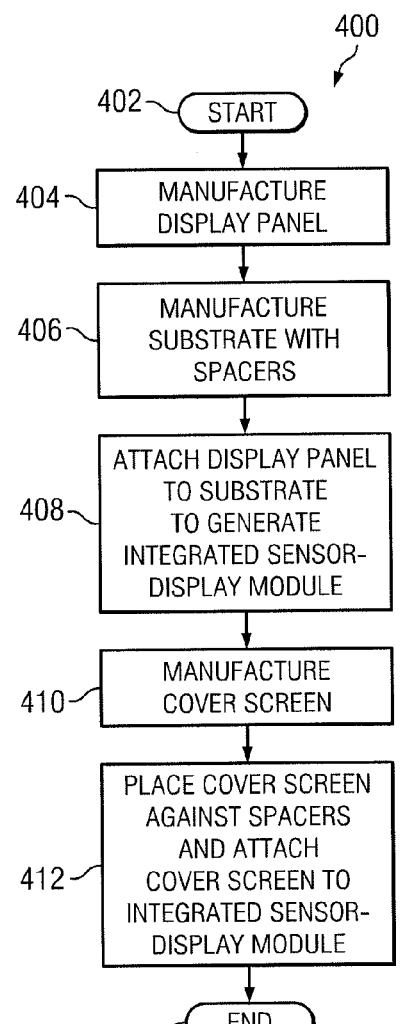
FIG. 4 illustrates an example method for forming a touch sensor with spacers supporting a cover panel.

FIG. 4 illustrates an example method 400 for funning touch sensor 10 with spacers 210 supporting a cover panel 202. The method begins at step 400. At step 402, display panel 204 is formed. Display panel 204 may be any suitable means for displaying an image. For example, display panel 204 may include a liquid crystal display (LCD), light emitting diode (LED) display, or other suitable display.

At step 404, substrate 206a with spacers 210 is formed. Substrate 206a may be any suitable insulating material, such as PET or glass. In some embodiments, substrate 206a may be substantially transparent. Substrate 206a may be formed in any suitable manner. In some embodiments, substrate 206a may be manufactured with one or more sets of electrodes 208 formed thereon. Spacers 210 may be manufactured along with substrate 206a or may be formed or attached on substrate 206a after substrate 206a is manufactured. Spacers 210 may be formed in any suitable manner. For example, spacers 210 may be screen printed onto substrate 206a or attached to substrate 206a using an adhesive.

At step 406, display panel 204 is attached to substrate 206a to generate integrated sensor-display module 214. Display panel 204 may be attached to substrate 206a in any suitable manner. For example, a layer of adhesive 212 may be used to attach display panel 204 to substrate 206. As another example, one or more fasteners may be used to attach display panel 204 to substrate 206. In some embodiments, display panel 204 may be attached to multiple substrates 206 that each comprise one or more sets of electrodes 208.

At step 408, cover panel 202 is formed. In some embodiments, cover panel 202 may be manufactured independently of the components of integrated sensor-display module 214. In some embodiments, cover panel 202 is designed based on the characteristics of integrated sensor-display module 214. Cover panel 202 may be formed of any appropriate material, such as glass, plastic, or other suitable material. In some embodiments, cover panel 202 is substantially transparent. In some embodiments, cover panel 202 is at least substantially transparent. In some embodiments, cover panel 202 and/or substrate 206a may include spacers 210 formed thereon.

At step 410, cover panel 202 is placed against spacers 210 and attached to integrated sensor-display module 214. Cover panel 202 may be attached to integrated sensor-display module 214 in any suitable manner. For example, one or more fasteners may be used to attach cover panel 202 to integrated sensor display module 214. In some embodiments, the fasteners may be placed at one or more points of the outer edges of the cover panel. In some embodiments, another component of a device that includes touch sensor 10 may contact cover panel 202 and apply pressure to cover panel 202 such that cover panel 202 abuts against spacers 210. In some embodiments, cover panel 202 is removably attached to integrated sensor-display module 214. The method ends at step 412.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A touch sensor comprising:
   a first insulating substrate comprising a first face;
   a first plurality of electrodes comprising one or more conductive materials formed on the first insulating substrate;
   a plurality of spacers disposed in-between the electrodes and disposed on the first face of the first insulating substrate, each spacer of the plurality of spacers extending substantially the same distance from the first face of the first insulating substrate;
   a cover panel attached to the first insulating substrate and disposed outwardly from the plurality of spacers such that the plurality of spacers are in-between the first insulating substrate and the cover panel;
   wherein the first plurality of electrodes are disposed closer to the cover panel than any other electrodes in the touch sensor; and
   wherein the plurality of spacers are operable to maintain a substantially consistent air gap between the first plurality of electrodes and the cover panel.

2. The touch sensor of claim 1, further comprising a display panel attached to the first insulating substrate.

3. The touch sensor of claim 1, further comprising:
   a second insulating substrate disposed between the first insulating substrate and a display panel; and
   a second plurality of electrodes comprising one or more conductive materials formed on the second insulating substrate.

4. The touch sensor of claim 1, wherein each spacer of the plurality of spacers comprises an insulating material.

5. The touch sensor of claim 1, wherein each spacer of the plurality of spacers is generally spherical.

6. The touch sensor of claim 1, wherein each spacer of the plurality of spacers is polyhedron shaped.

7. The touch sensor of claim 1, wherein the plurality of spacers are arranged in a grid pattern on the first face of the first insulating substrate.

8. A method for forming a touch sensor, the method comprising:
   forming a first insulating substrate comprising a first face;
   forming a first plurality of electrodes comprising one or more conductive materials on the first insulating substrate;
   forming a plurality of spacers in-between the electrodes and on the first insulating substrate, the plurality spacers extending substantially the same distance from the first face of the first insulating substrate;
   forming a cover panel attached to the first insulating substrate and disposed outwardly from the plurality of spacers such that the plurality of spacers are in-between the first insulating substrate and the cover panel, wherein the first plurality of electrodes are disposed closer to the cover panel than any other electrodes in the touch sensor; and
   wherein the plurality of spacers are operable to maintain a substantially consistent air gap between the first plurality of electrodes and the cover panel.

9. The method of claim 8, further comprising attaching a display panel to the first insulating substrate.

10. The method of claim 8, further comprising:
    forming a second insulating substrate between the first insulating substrate and a display panel; and
    forming a second plurality of electrodes comprising one or more conductive materials formed on the second insulating substrate.

11. The method of claim 8, wherein each spacer of the plurality of spacers comprises an insulating material.

12. The method of claim 8, wherein each spacer of the plurality of spacers is generally spherical.

13. The method of claim 8, wherein each spacer of the plurality of spacers is polyhedron shaped.

14. The method of claim 8, wherein the plurality of spacers are arranged in a grid pattern on the first face of the first insulating substrate.

15. A touch sensor comprising:

a first insulating substrate comprising a first face;

a first plurality of electrodes comprising one or more conductive materials formed on the first insulating substrate;

a transparent cover panel attached to the first insulating substrate; and a plurality of spacers disposed in-between the electrodes and disposed on the first face of the first insulating substrate such that the plurality of spacers are in-between the first insulating substrate and the cover panel, wherein the first plurality of electrodes are disposed closer to the cover panel than any other electrodes in the touch sensor;

wherein the plurality of spacers are operable to maintain a substantially consistent air gap between the first plurality of electrodes and the cover panel.

16. The touch sensor of claim 15, further comprising a display panel attached to the first insulating substrate.

17. The touch sensor of claim 15, further comprising:

a second insulating substrate disposed between the first insulating substrate and a display panel; and a second plurality of electrodes comprising one or more conductive materials formed on the second insulating substrate.

18. The touch sensor of claim 15, wherein each spacer of the plurality of spacers comprises an insulating material.

19. The touch sensor of claim 15, wherein each spacer of the plurality of spacers is generally spherical.

20. The touch sensor of claim 15, wherein each spacer of the plurality of spacers is polyhedron shaped.

21. The touch sensor of claim 15, wherein the plurality of spacers are arranged in a grid pattern on the first face of the first insulating substrate.

* * * * *